US012463226B2

(12) United States Patent
Brandt et al.

(10) Patent No.: US 12,463,226 B2
(45) Date of Patent: Nov. 4, 2025

(54) FUEL CELL COOLING (71) Applicant: Siemens Energy Global GmbH & Co. KG, Bayern (DE)

(72) Inventors: Torsten Brandt, Forchheim (DE); Michael Braunecker, Nuremberg (DE); Frank Bärnreuther, Neustadt Aisch (DE); Arno Mattejat, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 393 days.

(21) Appl. No.: 17/910,816

(22) PCT Filed: Feb. 18, 2021

(86) PCT No.: PCT/EP2021/053978
§ 371 (c)(1),
(2) Date: Sep. 11, 2022

(87) PCT Pub. No.: WO2021/228445
PCT Pub. Date: Nov. 18, 2021

(65) Prior Publication Data
US 2023/0124648 A1  Apr. 20, 2023

(30) Foreign Application Priority Data
May 11, 2020 (DE) .................. 10 2020 205 871.7

(51) Int. Cl.
*H01M 8/0258* (2016.01)
*H01M 8/04029* (2016.01)
*H01M 8/10* (2016.01)
(52) U.S. Cl.
CPC ..... *H01M 8/0258* (2013.01); *H01M 8/04029* (2013.01); *H01M 2008/1095* (2013.01)

(58) Field of Classification Search
CPC ....... H01M 8/258–267; H01M 8/0258; H01M 8/04029; H01M 2008/1095;
(Continued)

(56) References Cited

U.S. PATENT DOCUMENTS

2004/0191606 A1* 9/2004 Lee ............... H01M 8/0265
429/444
2006/0046130 A1* 3/2006 Lai ................ H01M 8/2483
429/457
(Continued)

FOREIGN PATENT DOCUMENTS

DE   102014206336 A1 * 10/2015 .......... H01M 8/2483
EP       1689013 B1      7/2011
(Continued)

OTHER PUBLICATIONS

English machine translation of DE 102014206336 A1 (Year: 2015).*
(Continued)

*Primary Examiner* — Dah-Wei D. Yuan
*Assistant Examiner* — Pin Jan Wang
(74) *Attorney, Agent, or Firm* — Wolter Van Dyke Davis, PLLC (57) ABSTRACT A bipolar plate for an electrochemical cell, includes a flow space arranged between a first and a second plate element and has a flow inlet and a flow outlet for a coolant flowing through the flow space. Each plate element has a contact plane for contacting the other plate element and, between the flow inlet and the flow outlet, a plurality of elevations protrude from the contact plane and face away from the other plate element. The elevations have openings facing the contact plane. First flow channels are formed through the openings in the elevations by the elevations of the two plate elements being offset from one another. Each elevation at least partially overlaps at least one elevation of the other
(Continued)

plate element. A direction-dependent flow resistance is set in the first flow channels of the bipolar plate.

12 Claims, 6 Drawing Sheets

(58) Field of Classification Search
CPC .. H01M 8/0297; H01M 8/026; H01M 8/0267; H01M 8/0263; H01M 8/0265; Y02E 60/50
See application file for complete search history.

(56) References Cited

U.S. PATENT DOCUMENTS

| | | | |
|---|---|---|---|
| 2007/0015019 A1* | 1/2007 | Baschek | H01M 8/04074 |
| | | | 429/514 |
| 2015/0311539 A1 | 10/2015 | Brandt | |
| 2017/0279131 A1* | 9/2017 | Poirot-Crouvezier | ....................... |
| | | | H01M 8/0254 |
| 2022/0278347 A1* | 9/2022 | Harvey | H01M 8/249 |

FOREIGN PATENT DOCUMENTS

| | | |
|---|---|---|
| KR | 20140140547 A | 12/2014 |
| WO | 2004107486 A1 | 12/2004 |

OTHER PUBLICATIONS

PCT International Search Report and Written Opinion of International Searching Authority mailed May 27, 2021 corresponding to PCT International Application No. PCT/EP2021/053978 filed Feb. 18, 2021.

\* cited by examiner

FUEL CELL COOLING

CROSS REFERENCE TO RELATED APPLICATIONS

This application is the US National Stage of International Application No. PCT/EP2021/053978 filed 18 Feb. 2021, and claims the benefit thereof. The International Application claims the benefit of German Application No. DE 10 2020 205 871.7 filed 11 May 2020. All of the applications are incorporated by reference herein in their entirety.

FIELD OF INVENTION

The invention relates to a bipolar plate for the cooling of an electrochemical cell, and to an electrochemical cell, especially a fuel cell, comprising such a bipolar plate.

BACKGROUND OF INVENTION

Electrochemical cells are common knowledge. In a galvanic electrochemical cell, in the inverse of electrolysis, chemical energy is converted to electrical energy. A known apparatus for such a galvanic cell is the fuel cell, in which the chemical energy carrier is not stored in the cell but provided continuously from the outside, which enables continuous operation in principle.

A known type of fuel cell is the low-temperature fuel cell based on polymer electrolyte membrane (PEM) technology, the main fields of use of which are particularly in the mobile sector without utilization of waste heat, for example in submarines.

An essential element of a single PEM cell is a membrane-electrode assembly. This consists of two electrodes (an anode and a cathode), and an electrolyte membrane present between the two electrodes. There is a catalyst layer between the electrodes and the electrolyte membrane, in which the important physical and electrochemical processes, such as adsorption of hydrogen and oxygen at the catalyst, release and uptake of electrons, and the formation of water proceed on the cathode side through combination of protons that have diffused through the membrane and (reduced) oxygen.

In a fuel cell stack, the electrodes are each in contact with what is called a bipolar plate via a gas diffusion layer on the side remote from the electrolyte membrane or catalyst layer. This bipolar plate component has the function of separating the individual fuel cells (on the media side), of ensuring current flow in the cell stack and of removing the heat of reaction. In order to ensure effective flow of current, a bipolar plate consists of electrically conductive material that must have a low transfer resistance to the electrodes.

Typically, these bipolar plates consist of two plate elements that are provided with an often machined gas channel structure, and cooling water flows through them in operation.

One example of a bipolar plate can be found in DE 10 2014 206 336 A1. The bipolar plate disclosed therein comprises two plates joined to one another that, in cross section, each have a periodic structure with recesses, with depressions formed by the recesses in both plates that are arranged so as to face away from one another and to form a coolant flow region. The recesses here are formed exclusively in a distributor structure of the bipolar plate which is disposed upstream and/or downstream of a flow field in main flow direction, and partly overlap, so as to provide a coolant flow region that permits longitudinal and transverse flow.

Further examples of a bipolar plate are known from US 2007/0015019 A1 and from WO 2004/107486 A1. The separator plate or bipolar plate comprises two profiles plate elements that are in contact at contact faces, between which a fluid space or flow space for the coolant is formed. The plate elements have multiple embossments disposed on the surface of the plate elements in the form of round elevations facing away from one another with depressions facing one another. The embossments on the two plate elements are offset relative to one another, such that pimple midpoints of one plate element lie above a triangle midpoint of the other plate element, such that there are clear flow pathways for the cooling water between the plates in which the water can flow from the pimple on the lower plate element into the pimple on the upper plate element.

All elevations/pimples or all elevations/pimples in a particular region here are of equal size. The passage regions are the same size in all positions. Nevertheless, the temperature field is inhomogeneous and has local peaks.

Regions having high temperatures impair the service life of the materials there, especially when the temperatures are well above the average temperature profile.

SUMMARY OF INVENTION

It is an object of the invention to provide a bipolar plate for an electrochemical cell that enables improved cooling and which can simultaneously be produced in a very simple and inexpensive manner. It is a further object of the invention to provide an electrochemical cell having such a bipolar plate.

The invention proceeds from the finding that, in the regions of the temperature peaks, the cooling water flow is lower than in better-cooled regions, and that this nonuniformity is caused in that the flow resistance is uniformly isotropic over the area. The effect of this is that particularly the edge and corner regions have lower flow than the middle region of the cooling field.

The invention achieves the object directed to a bipolar plate in that, in such a bipolar plate for an electrochemical cell, comprising a flow space which is disposed between a first plate element and a second plate element and has a flow inlet and a flow outlet for a coolant that flows through the flow space, wherein each plate element has a contact plane for contact with the respective other plate element and, between the flow inlet and the flow outlet, a multitude of elevations which project out of the contact plane and face away from the respective other plate element and which have openings toward the contact plane, and wherein first flow channels are formed by the openings of the elevations in that the elevations of the two plate elements are offset with respect to one another, wherein each elevation at least partly overlaps with at least one elevation of the respective other plate element, a direction-dependent flow resistance is established in the first flow channels of the bipolar plate.

It is advantageous here when the flow resistance in the direction of a connecting line between flow inlet and flow outlet is greater than at right angles thereto, such that, in particular, the edge regions profit from this inhomogeneity without a flow inlet or flow outlet.

It is also advantageous when the elevations have frustoconical profiles with regard to the production of the plate elements, but also with regard to flow characteristics of the cooling medium in the first flow channels.

In an advantageous embodiment, the elevations are disposed on the plate elements in the vertices of regular triangles and the plate elements are arranged offset with respect to one another such that, in a projection onto the contact plane, an elevation of the first plate element is in an off-center arrangement within a triangle of elevations of the second plate element. This gives rise to passage regions that are no longer all the same but become larger in particular regions and smaller in others. This makes the flow resistance inhomogeneous or direction-dependent. There are regions (lines) in which it is smaller and those in which it is greater than in the case of the centered arrangement. As a result of this inhomogeneity, the cooling water can be steered, for example, advantageously widthwise, i.e. transverse to the direct line between flow inlet and flow outlet, especially into the corners of the bipolar plate, and only then over the length of the cell. The flow line pattern is thus likewise broadened, and the cooling water can be directed into the corner regions better than in the case of a homogeneous flow resistance distribution. The exact adjustment of the flow field and hence the temperature field can be influenced via the degree of movement.

It is especially advantageous when a main axis of a plate element, said axis being defined by two adjacent elevations on a plate element, is oriented at right angles to the connecting line, wherein one elevation on the first plate element has been moved parallel to the connecting line from a centered position relative to the closest three elevations on the second plate element such that the separation thereof from the closest elevation on the second plate element is greater in a direction parallel to the connecting line than from the two other closest elevations on the second plate element. In such a configuration, the cooling medium flow is advantageously set at right angles to the direct connecting line between flow inlet and flow outlet.

In an advantageous embodiment of the invention, at least two elevations on a plate element are combined to form a second flow channel. The passage regions between the two plate elements become larger as a result, and hence the flow resistance becomes less.

It may be appropriate when the second flow channels are disposed at least in edge regions of the bipolar plate without a flow inlet or flow outlet. It is very particularly advantageous when the second flow channels form a circumferential ring channel along the edges of the bipolar plate, i.e. in the edge regions.

In order to further reduce the flow resistance in particular regions, it may be advantageous when a separating land formed between two adjacent second flow channels on a plate element has a non-zero distance from the contact plane. A height of the separating land may, if necessary, be zero, meaning that there is no separating land 16 between two adjacent second flow channels. By suitable choice of the land height, it is possible to adjust the flow resistance and hence the volume flow rate to the desired degree.

In an advantageous embodiment of the invention, an orientation of a second flow channel on the first plate element is different than the orientation of a second flow channel on the second plate element. Thus, improved exchange of the cooling medium is possible between the second flow channels of a plate element.

The object directed to an electrochemical cell is achieved by an electrochemical cell comprising at least one bipolar plate according to the invention.

The offset of the elevations, the ring channel or else a combination of the two creates the opportunity to influence the flow field in such a way that the temperature field becomes uniform and temperature peaks are avoided. This principle can be applied to any desired outer geometries of heatsinks (rectangular, square, horizontal or vertical arrangement).

The offset of the elevations merely influences the cooling water space; there is no influence on the gas space of the cells which is outside the flow space for the cooling water.

If two flow channels or one ring channel are used, the edge region(s) of the gas spaces is/are altered, but the height of the land between the channels permits sufficient optimization between gas and water distribution and supply and removal on the gas sides.

BRIEF DESCRIPTION OF THE DRAWINGS

The invention is elucidated in detail by way of example with reference to the drawings. The drawings are not to scale and show, in schematic form.

DETAILED DESCRIPTION OF INVENTION

Identical reference numerals have the same meaning in different figures.

Figure 1:
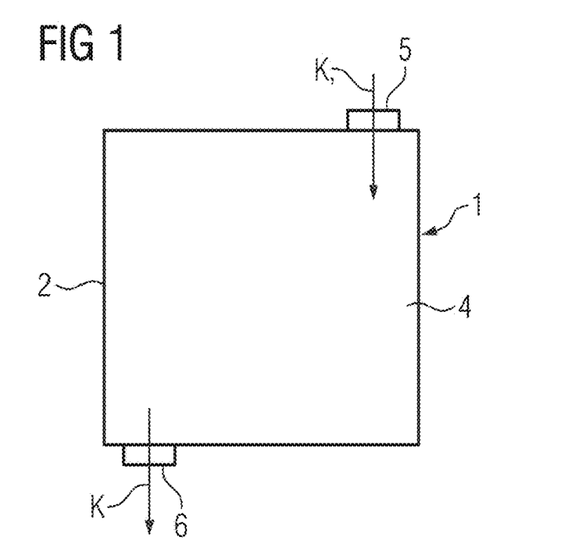
FIG. 1 a greatly simplified top view of a bipolar plate.

FIG. 1 shows a bipolar plate 1 for a fuel cell, not shown in detail, in a schematic top view. Within the bipolar plate 1, a flow space 4 is formed for coolant K, for example cooling water. Cooling water is introduced into the flow space 4 via a flow inlet 5 and guided out through a flow outlet 6 disposed on an opposite side. The flow inlet 5 and the flow outlet 6 here are on a diagonal line which is not shown in detail.

The flow space 4 is bounded on its two spatial sides by two plate elements 2, 3, of which just one first plate element 2 is visible in FIG. 1. The plate elements 2, 3 are metallic. The surfaces of the plate elements 2, 3 additionally have profiling which is not shown in FIG. 1.

Figure 2:
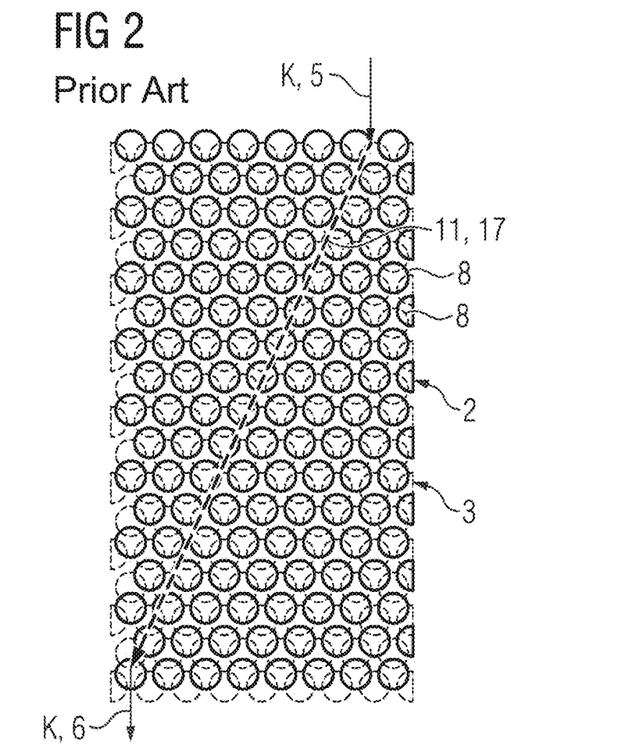
FIG. 2 a top view of two mutually superposed plate elements with a bipolar plate according to the prior art with homogeneous flow resistance, FIG. 3 a somewhat more detailed top view of two mutually superposed plate elements of a bipolar plate according to the prior art with a cross section line, FIG. 4 a side view of a section along the cross section line in FIG. 3, FIG. 5 flow lines of the cooling water according to the prior art, FIG. 6 flow lines of the cooling water according to the invention, FIG. 7 a hydraulic main element of the cooling water space according to the prior art, FIG. 8 a hydraulic main element of the cooling water space according to the invention, FIG. 9 a first plate element according to the invention in top view and side view, FIG. 10 a top view of the second plate element, and FIG. 11 a bipolar plate and the arrangement of a ring channel.
Figure 3:
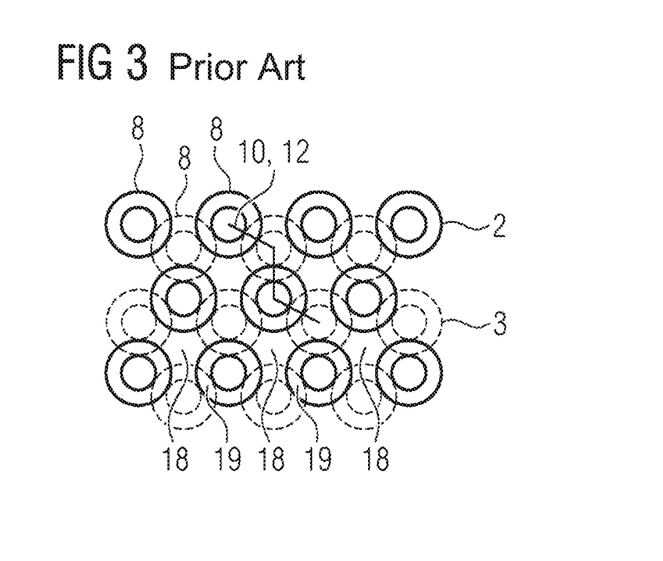
Figure 4:
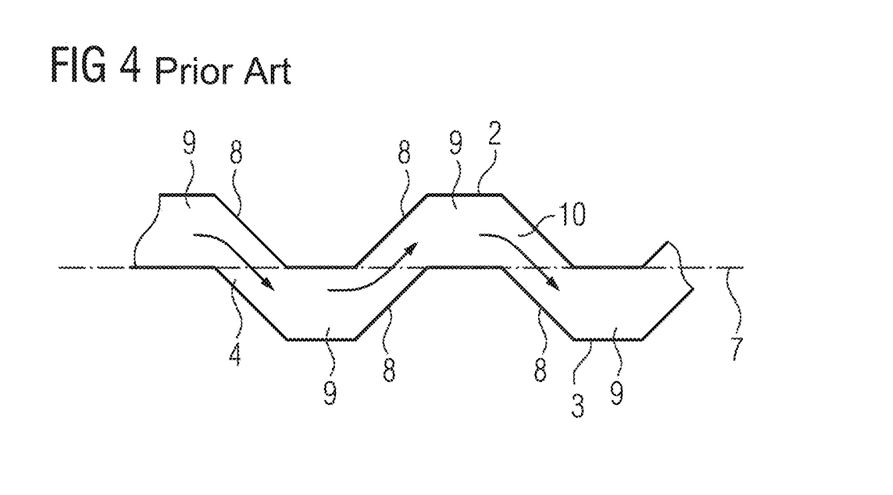

The construction and arrangement of the plate elements 2, 3 according to the prior art is shown in FIGS. 2, 3 and 4. A multitude of elevations 8 in a pimple form has been embossed into the plate elements 2, 3. In FIGS. 2 and 3, the elevations 8 on the first plate element 2 are shown by a solid line, while elevations 8 on the second plate element 3 are shown by a dotted line.

FIG. 2 also shows a main flow direction 17, which is illustrated essentially by the connecting line 11 between the flow inlet 5 and the flow outlet 6.

FIG. 3 shows a somewhat more detailed top view of two mutually superposed plate elements 2, 3 of a bipolar plate 1 according to prior art. In particular, the hydraulic main elements of the cooling water space of the bipolar plate 1 are shown. Also shown by way of example by a cross section line 12 is a possible pathway for the passage of cooling water in the bipolar plate 1. The side view of the section along the cross section line 12 is shown in FIG. 4 and gives the best description of the way in which the cooling water pathway arises.

As apparent from FIG. 4, the elevations 8 on one of the plate elements 2, 3 face away from those on the respective other plate element 2, 3. The elevations 8 according to FIG. 2, FIG. 3 and FIG. 4 all have a circular cross section and are of equal size and in asymmetric arrangement. Each of the plate elements 2, 3 has a contact plane 7 by which it rests on the other plate element 2, 3, and from which the elevations 8 project outward. Contact between the two plate elements 2, 3 is in the contact plane 7.

The elevations 8 or pimples embossed in the material of the plate elements 2, 3 have an opening 9 toward the contact plane 7. In the assembled state of the bipolar plate 1, the elevations 8 are offset from one another. Such an arrangement results in contact regions 18 (see FIG. 3) at which the plate elements 2, 3 are in contact and hence no cooling water can flow. Also formed, however, are regions 19 in which the elevations 8 partly overlap. In these overlap regions 19, cooling water can flow from one side of the contact plane 7 to the other, such that a multitude of discrete first flow channels 10 for the cooling water K run through the elevations 8 in the flow space 4. FIG. 3 shows a portion of a first flow channel 10, the course of which also follows the cross section line 12. In FIG. 4, a first flow channel 10 is indicated by the curved arrows.

Figure 5:
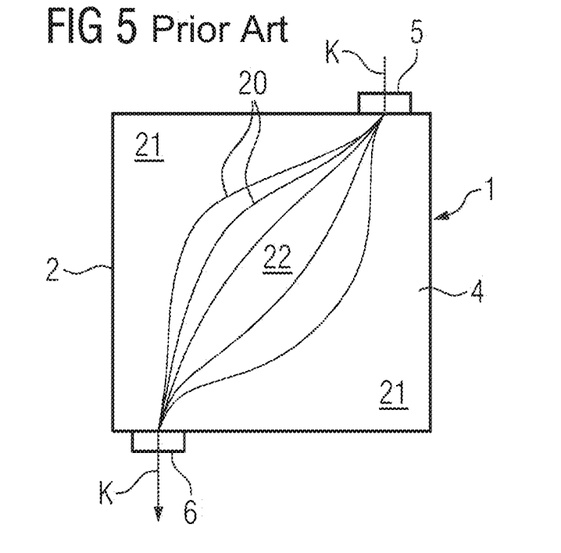

FIG. 5 shows the flow lines 20 of the cooling water in the bipolar plate 1 according to prior art in a greatly simplified schematic drawing. The flow through corner regions 21 is comparatively low; the flow through the middle region 22 is comparatively high. This results in a nonuniform temperature distribution in the bipolar plate 1. Owing to the low flow of cooling water in the corner regions 21, higher temperatures arise there in operation than in the middle region 22.

Figure 6:
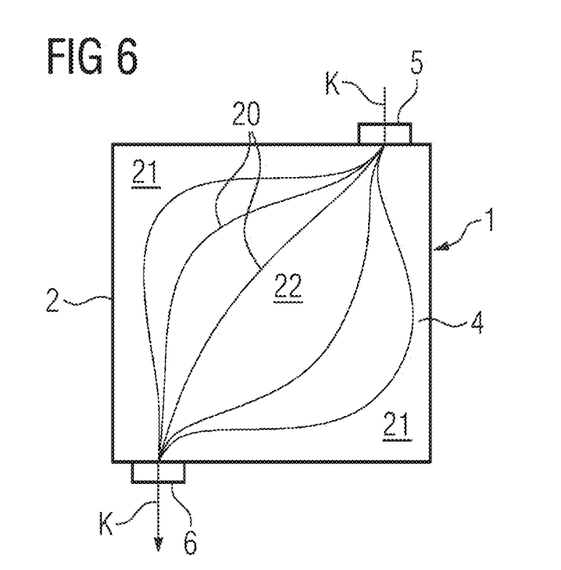

FIG. 6 shows the flow lines 20 of the cooling water in the bipolar plate 1 according to the invention. The flow through the corner regions 21 is higher; the flow through the middle region 22 is correspondingly weaker. This can result in a temperature distribution which is homogeneous even into the corner regions.

Figure 7:
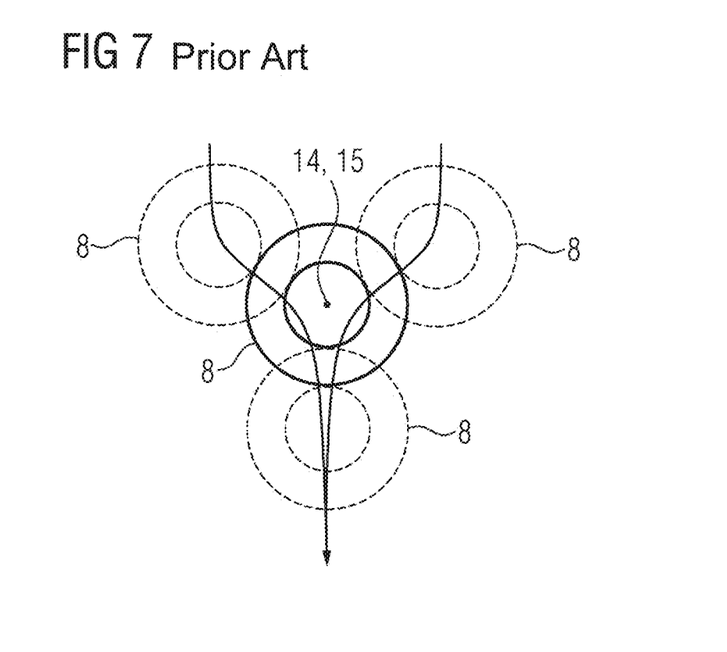
Figure 8:
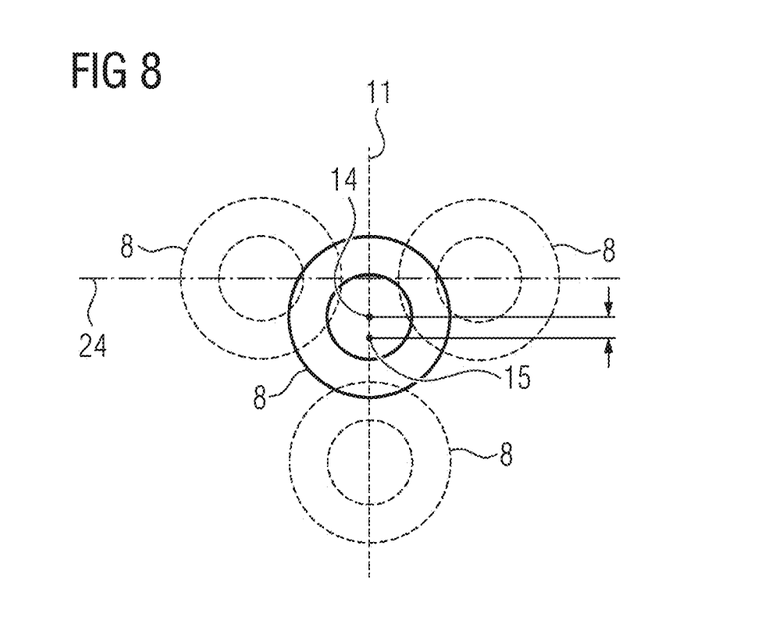

FIGS. 7 and 8 effectively show a hydraulic main element of the flow space 4 of a bipolar plate 1. FIG. 7 shows the prior art, in which the center 14 of an elevation 8 on the first plate element 2 is above the center of a triangle 15 on the second plate element 3, and in which a flow resistance for a cooling medium is not dependent on direction, the effect of which is that the cooling medium seeks the shortest pathway from the flow inlet 5 to the flow outlet 6, and this extends essentially along the connecting line 11 (see FIG. 2). The flow through the corner regions 21 is lower than through the middle region 22 (see FIG. 5).

There is a change in these flow characteristics when the plate elements 2, 3 are moved relative to one another such that the center 14 of an elevation 8 of the first plate element 2 no longer lies above a center of a triangle 15 on the first plate element 3, but is moved roughly in the direction of the flow inlet 5, which results in passage regions of different size for different directions in the flow space 4.

In the specific working example of FIG. 8, a main axis 24 of a plate element 2, 3 defined by two adjacent elevations 8 on a plate element 2, 3 is oriented at right angles to the connecting line 11, with movement of an elevation 8 on the first plate element 2 from a centered position relative to the closest three elevations 8 on the second plate element 3 parallel to the connecting line 11 such that its distance from the closest elevation 8 on the second plate element 3 is greater in a direction parallel to the connecting line 11 than from the two other closest elevations 8 on the second plate element 3.

In hydraulic terms, what this means for the cooling network is that the flow resistance in a direction roughly at right angles to the connecting line 11 between flow inlet 5 and flow outlet 6 is significantly lower than in the direction at right angles thereto, i.e. roughly along the connecting line. This leads to intensification of the cooling water flow into the corner regions 21 of the flow space 4.

Figure 9:
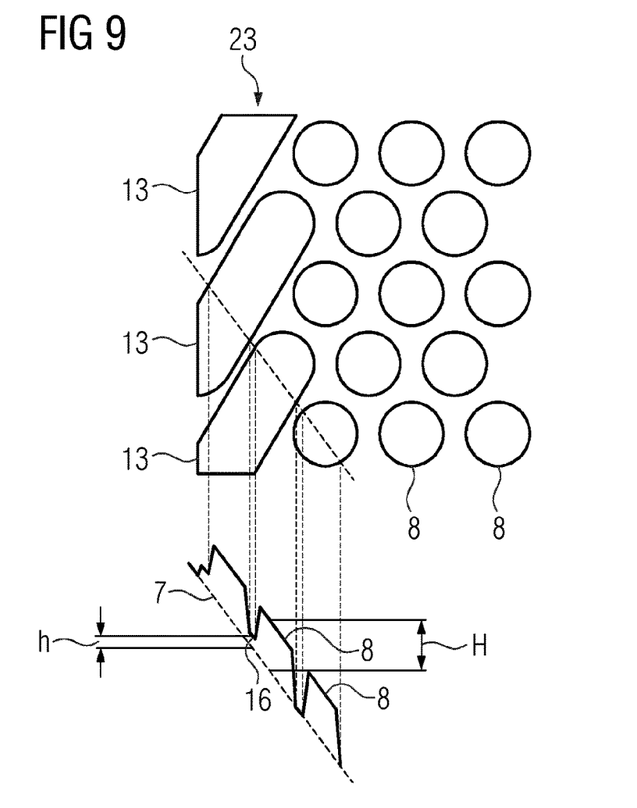
Figure 10:
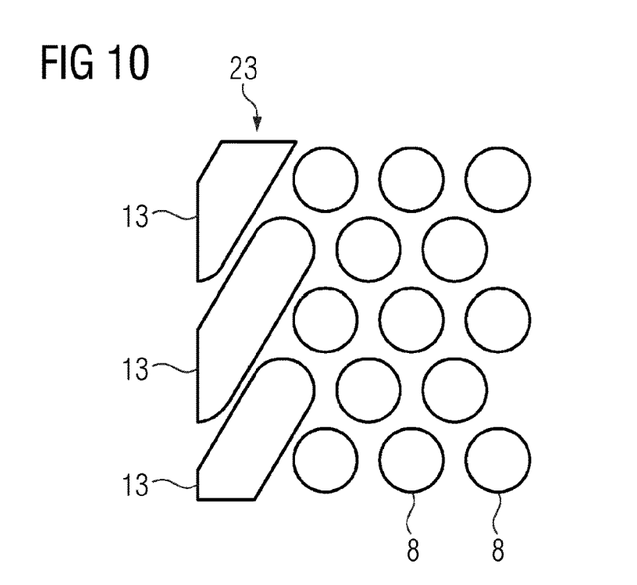

FIGS. 9 and 10 show a working example of an edge region 23 of the plate elements 2, 3 that has been altered compared to the prior art. FIG. 9 shows a schematic of a horizontal cross section through a portion of the first plate element 2, i.e. a section parallel to the plane of the first plate element 2. FIG. 10 shows a corresponding cross section for the second plate element 3.

FIG. 9 also shows a vertical cross section through the first plate element 2 in the edge region 23. The cross section runs transverse to elevations 8 that are combined in the edge region 23 to form second flow channels 13. The second flow channels 13 are separated by a separating land 16. A height of the separating land 16, i.e. the difference between height of the elevations 8 and distance of the separating land 16 from the contact plane 7, can be chosen freely, and hence the flow resistance in the edge region 23 as well.

"h" in FIG. 9 denotes the distance of the separating land 16 from the contact plane 7. The height of the elevations 8 is labeled H. A comparatively small h means a comparatively high flow resistance in the edge region 23, at least between the second flow channels 13; a comparatively large h, meaning that there is virtually no land, consequently means a comparatively small resistance between the second channels 13 in the edge region 23. In the extreme case, h corresponds to the height H of the elevations 8 over the contact plane 7.

Figure 11:
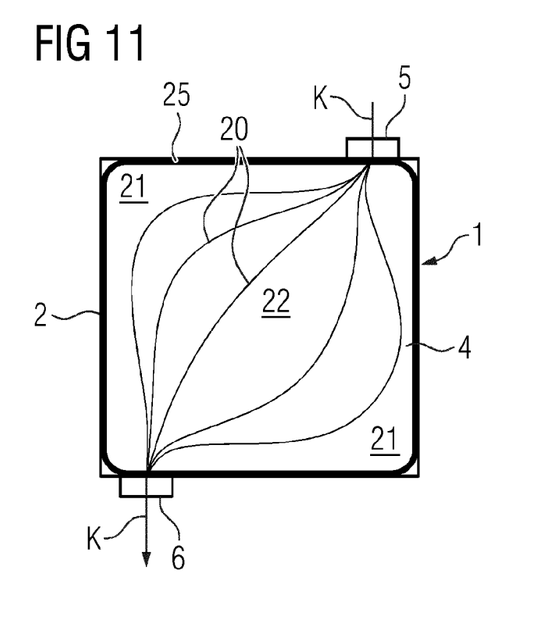

With the second flow channels 13 and the corresponding choice of height of the separating land 16, it is thus possible to form a circumferential ring channel 25 in the edge regions 23. Such a ring channel 25 is indicated in FIG. 11. The diagram in FIG. 11 is very schematic and differs from FIG. 6 merely by that feature. The ring channel 25 need not necessarily, as shown in FIG. 11, have a uniform width over the entire flow pathway. Variances are possible; especially in the corners, it may be desirable for the flow resistance to be particularly low.

The invention claimed is:
1. A bipolar plate for an electrochemical cell, comprising:
   a flow space which is disposed between a first plate element and a second plate element and which comprises a flow inlet and a flow outlet for a coolant that flows through the flow space,
   wherein each plate element comprises a contact plane for contact with the respective other plate element of the first and second plate elements and, between the flow inlet and the flow outlet, each plate element comprises a multitude of elevations which project out of the contact plane and face away from the respective other plate element and which define openings toward the contact plane, and wherein first flow channels are formed by the openings of the elevations in that the elevations of the first and the second plate elements are offset with respect to one another, wherein each elevation of the multitude of elevations of the first plate element at least partly overlaps with at least one elevation of the multitude of elevations of the second plate element, wherein a direction-dependent flow resistance is established in the first flow channels of the bipolar plate in that the elevations on the plate elements are disposed in vertices of regular triangles, and wherein the plate elements are arranged offset with respect to one another such that, in a projection onto the contact plane, a center of a select elevation of the first plate element is disposed within but not centered in an associated triangle of the regular triangles, wherein the associated triangle is formed by respective centers of three elevations of the second plate element that are closest to the select elevation of the first plate element.

2. The bipolar plate as claimed in claim 1, wherein a flow resistance in a direction of a connecting line between the flow inlet and the flow outlet is greater than at right angles thereto.

3. The bipolar plate as claimed in claim 1, wherein the elevations have frustoconical profiles.

4. The bipolar plate as claimed in claim 1, wherein a main axis is defined by the respective centers of a first elevation and a second elevation of the three elevations that form the associated triangle, wherein the main axis is oriented at right angles to a connecting line, wherein a center of a third elevation of the three elevations is centered on the connecting line, wherein the center of the select elevation of the first plate element is disposed on the connecting line between the center of the associated triangle and the main axis such that a distance to the center of the third elevation is greater than distances to the respective centers of the first elevation and the second elevation.

5. The bipolar plate as claimed in claim 1, further comprising second flow channels on the first plate element, each second flow channel being formed by a combination of at least two elevations of the first plate element.

6. The bipolar plate as claimed in claim 5, wherein the second flow channels are disposed only in edge regions of the bipolar plate and wherein at least some of the second flow channels are disposed in edge regions without the flow inlet or the flow outlet.

7. The bipolar plate as claimed in claim 6, wherein the second flow channels form a circumferential ring channel in the edge regions.

8. The bipolar plate as claimed in claim 5, wherein a separating land formed between two adjacent second flow channels of the second flow channels on the first plate element comprises a non-zero distance from the contact plane.

9. The bipolar plate as claimed in claim 8, wherein a height of the separating land is zero.

10. The bipolar plate as claimed in claim 5, further comprising second flow channels on the second plate element, each second flow channel on the second plate element being formed by a combination of at least two elevations of the second plate element, wherein an orientation of the second flow channels on the first plate element is different than the orientation of the second flow channels on the second plate element.

11. The bipolar plate as claimed in claim 1, wherein the associated triangle is one of a plurality of associated triangles;

wherein the select elevation is one of a plurality of select elevations; and wherein the plurality of associated triangles and the plurality of select elevations define a main flow field that extends the entire way between the flow inlet and the flow outlet.

12. An electrochemical cell, comprising:
at least one bipolar plate as claimed in claim 1.

* * * * *